Nov. 7, 1939.  H. D. CRAWFORD  2,178,930
OIL FILTER
Filed June 29, 1937  2 Sheets-Sheet 2
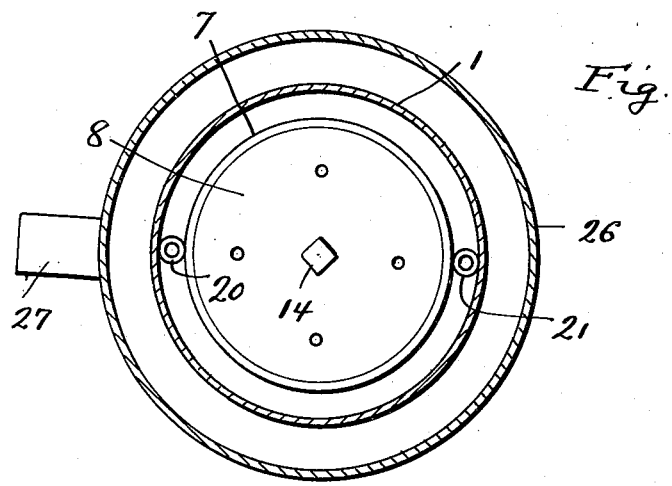
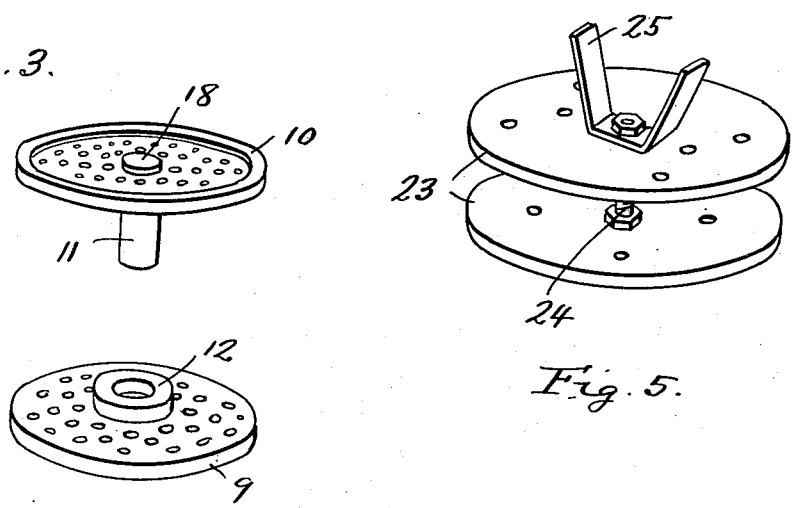
Inventor
Harry D. Crawford
By Clarence A. O'Brien
Hyman Berman
Attorneys Patented Nov. 7, 1939

2,178,930

UNITED STATES PATENT OFFICE 2,178,930

OIL FILTER

Harry D. Crawford, Chippewa Falls, Wis.

Application June 29, 1937, Serial No. 151,049

1 Claim. (Cl. 210—131)

The present invention relates to new and useful improvements in oil filters particularly for the internal combustion engines of motor vehicles but it will be understood, of course, that a filter constructed in accordance with the present invention may be used for any purpose for which it may be found adapted and desirable.

One of the important objects of the invention is to provide, in a manner as hereinafter set forth, a filter of the aforementioned character embodying a novel construction, combination and arrangement of parts whereby the filtering medium, such as felt or any other suitable material, may be compressed or packed as desired to meet various conditions, such as when heavy, medium or light oil is being used.

Another very important object of the invention is to provide an oil filter of the character described embodying a construction which is such that the filtering medium may be conveniently removed and replaced when desired.

Still another very important object of the invention is to provide an oil filter of the character set forth which is adapted to be operatively connected with the water cooling system of the engine in a manner to heat the oil as it passes through said filter.

A still further important object of the invention is to provide a filter of the character described embodying a construction and arrangement whereby the force of gravity is also utilized to separate foreign matter, such as dirt, grit, etc., from the oil.

Other objects of the invention are to provide an oil filter of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in horizontal section, taken substantially on the line 2—2 of Fig. 1.

Figure 3 is a detail view in perspective of the perforated piston.

Figure 4 is a detail view in perspective of the vertically movable, perforated disk.

Figure 5 is a perspective view of the vertically spaced perforated baffles.

Figure 1:
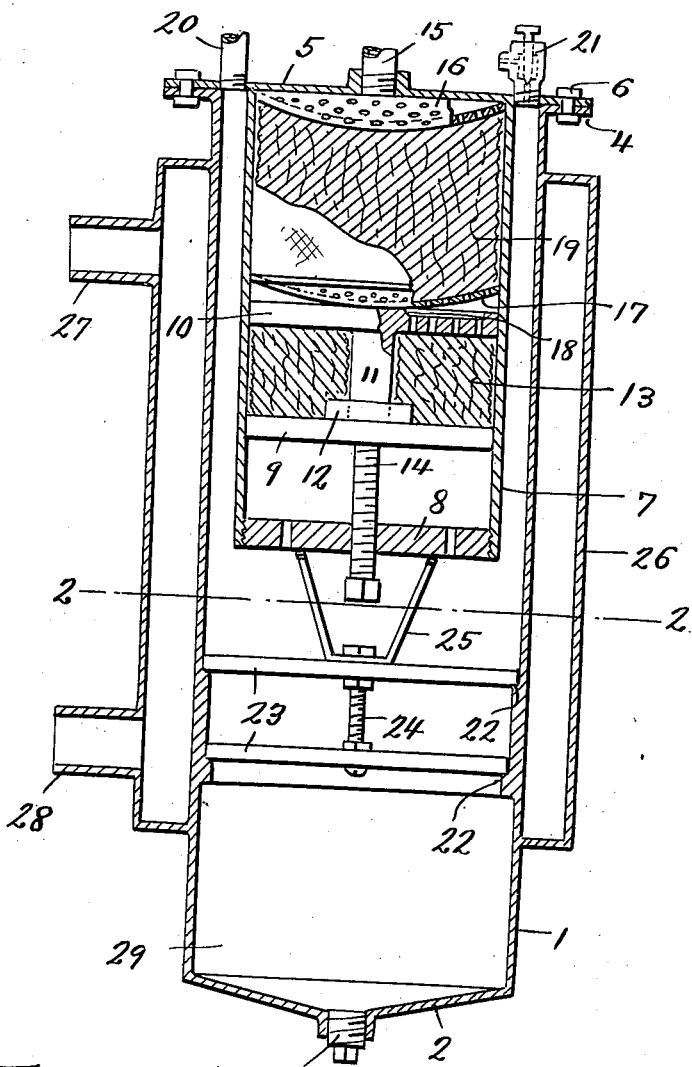
Figure 1 is a view in vertical section through an oil filter constructed in accordance with the present invention.

Referring now to the drawings in detail, it will be seen that the embodiment of the invention which has been illustrated comprises a cylindrical housing 1 of suitable dimensions and material, said housing being provided with a substantially conical bottom 2 which is provided with a drain plug 3. The top of the cylindrical housing 1 is open and formed thereon is an external flange 4. The reference numeral 5 designates a closure for the top of the housing 1, said closure being secured to the flange 4, as at 6.

Depending from the closure 5 into the housing 1 in spaced, concentric relation thereto is a cylinder 7. The cylinder 7 extends downwardly to an intermediate point in the housing 1 and threadedly mounted in the lower end portion of said cylinder is a removable perforated plate 8. Mounted for vertically adjustment in the lower portion of the cylinder 7 is a perforated disk 9. The reference numeral 10 designates a perforated piston which is slidably mounted in the cylinder 7 and which is provided with a centrally located, depending supporting stem 11 which is mounted in a socket 12 which is provided therefor on the disk 9. A comparatively loosely packed filtering medium 13 is provided in the cylinder 7 between the disk 9 and the piston 10. Threadedly mounted in the plate 8 is an adjusting screw or bolt 14 on which the disk 9 rests.

An oil discharge pipe 15 communicates with the upper end of the cylinder 7 through the closure 5. Mounted in the upper end portion of the cylinder 7 is a substantially concavo convex perforated disk 16. A substantially similar disk 17 rests on the raised central portion 18 on the piston 10. Mounted between the elements 16 and 17 in the upper portion of the cylinder 7 is a comparatively tightly packed filtering medium 19. An oil inlet pipe 20 communicates with the upper portion of the housing 1 through the closure 5. The reference numeral 21 designates a vent valve in the closure 5 for releasing air that may accumulate in the housing 1.

Vertically spaced shoulders 22 are formed in the lower portion of the cylindrical housing 1 in spaced relation below the lower end of the cylinder 7 and mounted horizontally on said shoulders are perforated baffles 23. A bolt 24 secures the baffles 23 together in spaced relation. Rising from the upper baffles 23 is a substantially U-shaped stop member 25 which is engaged beneath the plate 8 for retaining the baffles on the shoulders 22.

Encircling the major portion of the housing 1 is a hot water jacket 26. The jacket 26 is provided with an inlet 27 and an outlet 28 for connection with the water cooling system of the engine (not shown).

Briefly, the operation of the device is substantially as follows:

Oil from the pipe 20 enters the top of the housing 1 and flows downwardly between said housing and the cylinder 7. After passing the lower end of the cylinder 7, the oil flows upwardly into said cylinder through the perforations in the plate 8, through the disk 9, the medium 13, the perforated piston 10, the element 17, the medium 19 and then through the element 16 to the discharge pipe 15. By operating the adjusting bolt 14 the perforated disk 9 and the perforated piston 10 may be moved upwardly in the cylinder 7 for compressing the filtering medium 19 as desired. For example, the medium 19 will be comparatively tightly packed or compressed when light oil is being used in the engine. As the oil flows downwardly and then upwardly in the device, dirt, grit and other foreign matter will be separated therefrom by gravity and pass downwardly through the vertically spaced perforated baffles 23 into the sediment chamber 29 in the lower end portion of the housing 1. The sediment laden oil in the chamber 21 may be conveniently drained by removing the plug 3. The filtering or cleaning of the oil is further facilitated and promoted by the flow of hot water from the cooling system of the engine through the jacket 26 which, of course, heats the oil in the housing 1. By removing the closure 5 with the cylinder 7 thereon from the housing 1 and then removing the plate 8 from said cylinder the elements in said cylinder, such as the filtering mediums 13 and 19, may be conveniently removed to be renewed or for any other purpose.

It is believed that the many advantages of an oil filter constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

An oil filter comprising a cylindrical housing having a substantially conical bottom and open flanged top, an integral jacket surrounding said housing intermediate the ends thereof having fluid inlet and outlet openings therein for connection with a hot water supply, a closure for said housing having oil inlet and outlet openings therein, a cylinder depending from said closure in spaced relation to said housing communicating with said oil inlet at its lower end and communicating with said oil outlet at its upper end, a piston slidably mounted in said cylinder, a filtering medium in said cylinder adjacent said piston, perforated disks above and below said filtering medium and means for actuating said piston for compressing said filtering medium between said disks.

HARRY D. CRAWFORD.